United States Patent Office 3,220,957
Patented Nov. 30, 1965

3,220,957
CATALYST REGENERATION
Melvern C. Hoff, Highland, Ind., and Arnold N. Wennerberg, Chicago, Ill., assignors to Standard Oil Company, Chicago, Ill., a corporation of Indiana
No Drawing. Filed Oct. 31, 1962, Ser. No. 234,559
3 Claims. (Cl. 252—414)

This invention relates to an improvement in the synthesis of alcohols. More particularly, it relates to an improvement in the Oxo process for synthesizing alcohols. The Oxo process involves the catalyzed addition reaction of carbon monoxide and hydrogen to compounds containing an olefinic linkage, the catalyst generally being a metal carbonyl compound. This addition reaction yields organic carbonyl compounds as the predominant initial products. The organic carbonyl compounds are hydrogenated to the desired synthetic alcohols. It is to this last operation of hydrogenation that our invention specifically pertains. A detailed description of the Oxo process is available in various references, of which one example is "Higher Oxo Alcohols" by L. F. Hatch, J. Wiley & Sons, Inc. (1957).

Our invention comprises a novel method for regenerating the hydrogenation catalyst used in the hydrogenation step of the Oxo process.

In the conventional two-step chemical reaction for producing Oxo alcohols, a cobalt carbonyl is commonly employed as the catalyst for the carbonylation reaction between carbon monoxide, hydrogen and the olefin feed. This catalyst may be removed from the products stream by a process of decomposition brought about at elevated temperatures. During the decomposition, the cobalt portion of the catalyst is freed from chemical combination. The cobalt is recovered as cobalt metal and/or intermediate, insoluble cobalt carbonyls. Subsequently the organic products stream is subjected to a fixed bed hydrogenation process in which catalytically active cobalt metal on a support may be employed as the hydrogenation catalyst. A suitable inert support is a material such as pumice. A common catalyst for the hydrogenation of the organic carbonyl compounds obtained from the carbonylation first step of the Oxo process is about 20 percent by weight of cobalt on pumice. Such metal catalyst undergoes a progressive deactivation under the reaction conditions used for the hydrogenation of the carbonyl products stream. The reduction in yield of hydrogenation products by catalyst deactivation can be counterbalanced, to some extent, by the maintenance of progressive increases in the temperature within the hydrogenation reactor. These temperature increases are graduated in such fashion that the increase in reaction rate roughly compensates for the decrease in catalyst activity. Thus the overall rate of reaction remains relatively constant for a longer period of time than would otherwise be possible. Inevitably, however, a stage of catalyst deactivation is reached beyond which further increases in hydrogenation temperature do not maintain the rate of hydrogenation to alcohol products. Instead, excessive paraffination and a rapid increase in catalyst deactivation occur. The periodic increases in temperature lead to various side reactions, which produce a number of undesirable by-products within the hydrogenation reactor. These by-products are such organic compounds as esters, ketones, condensation products of aldehydes, by-product fatty acid soaps resulting from side reactions of formates, etc. Substances which are especially detrimental to the catalyst are those resulting from side reactions of formates and sulfur compounds present in the feed to the hydrogenation reactor. These contaminants in particular react with the metal hydrogenation catalyst to produce non-catalytically active compounds. Once the catalyst has undergone deactivation it is no longer useful and must be discarded, which necessitates an expensive replenishment of the catalyst in the reactor, and causes a consequent increase in the cost of producing alcohols by the Oxo process.

Our invention involves a novel procedure for regenerating a deactivated cobalt hydrogenation catalyst and restoring its activity so that it need not be discarded after one cycle of usage.

A further object of our invention is to provide a process whereby a cobalt hydrogenation catalyst can be regenerated in situ.

These and other objects of our novel process which will be obvious to those of ordinary skill in this art are accomplished according to the procedure set out hereinbelow.

Our novel process comprises the steps of subjecting a deactivated cobalt hydrogenation catalyst to treatment with carbon monoxide, at an elevated pressure of carbon monoxide and at a temperature sufficient to decompose cobalt carbonyls, while washing the catalyst with an organic compound which is a liquid under the conditions of reaction. Suitably, our novel process is performed upon deactivated cobalt hydrogenation catalysts under a partial pressure of carbon monoxide of from about 500 to about 2000 p.s.i. at a temperature in the range of 375° F. to 600° F. for a period of from about 5 to about 25 hours, and, while maintaining the catalyst under these conditions, passing a liquid organic compound over the catalyst at a space velocity in the range of from about 0.2 to 2.0 volumes per volume of catalyst per hour. Such a treatment of a deactivated cobalt hydrogenation catalyst effects decomposition of the organic cobalt compounds, which are responsible for catalyst deactivation, and regeneration of the cobalt metal as a catalytically active material. The catalytically inactive organic cobalt compounds which are the cause of catalyst deactivation may be such metal organic compounds as cobalt tightly bound to organic sulfur compounds, cobalt formate resulting from formylation of the cobalt catalyst in the hydrogenation reactor, cobalt nonanoate, etc., but we do not limit our process to the regeneration of any such catalytically inactive compounds in particular. Our inventive process is capable of regenerating a deactivated cobalt metal hydrogenation catalyst which has been used for the hydrogenation of a carbonyl products stream from the carbonylation first step reaction of the Oxo process, irrespective of the nature or precise chemical formula of the inactive cobalt organic compounds produced by reaction of deactivating organic compounds in the Oxo process stream with the cobalt metal hydrogenation catalyst.

The regeneration of deactivated cobalt metal hydrogenation catalyst may depend upon the formation of cobalt carbonyls from the catalytically inactive cobolt compounds, followed by a decomposition of such carbonyls and a deposition of unbound cobalt metal upon the pumice support, but the precise mode of regeneration is not known with certainty.

Organic liquids suitable for use as washing solvents in our novel regeneration procedure are materials which are liquids under the conditions of regeneration and inert with respect to the cobalt, such as hydrocarbons, aldehydes and alcohols. These washing liquids may conveniently be hydrocarbons or alcohols containing from about 1 to about 15 carbon atoms per molecule. A liquid which can satisfactorily be used as a washing material is the heavy bottoms fraction remaining after distillation of the desired Oxo alcohol products from the total hydrogenation product.

The total pressure employed during our novel regeneration procedure is not a critical factor so long as the partial pressure of carbon monoxide is maintained within the range set forth hereinabove. The temperature must be sufficient to decompose cobalt carbonyls under the existing carbon monoxide partial pressure, e.g., at least about 310° F. at about 500 p.s.i. partial pressure of carbon monoxide, and thereby effect the redeposition of metallic cobalt upon the pumice, but it is not otherwise a critical feature of our invention. The temperature should be low enough that the particular washing liquid being used remains liquid under the existing pressure.

A preferred set of conditions for the regeneration of a deactivated cobalt metal hydrogenation catalyst according to the method of our inventive process set forth in the following example:

Synthesis gas (a 1:1 mixture of carbon monoxide and hydrogen) at a total pressure of 3000 p.s.i. and a temperature of 380° F. to 420° F. is contacted for 15 hours with 20 percent by weight cobalt on pumice hydrogenation catalyst which is catalytically inactive following extended use for hydrogenation in the Oxo process. During this time iso-octyl alcohol (the commercial Oxo process product which is a mixture of isomers of octyl alcohol) is passed over the catalyst at a space velocity of 0.5 volume per volume of catalyst per hour. Following this treatment, the catalyst is again active for use under usual conditions of hydrogenation for the production of alcohols from carbonyl compounds in the Oxo process.

Our novel regeneration process for deactivated cobalt hydrogenation catalyst is especially advantageous in that regeneration can be performed without removing the deactivated catalyst from the vessel used for hydrogenation in the Oxo process stream. When regeneration is performed in situ, the hydrogenation vessel should be swept clean of carbon monoxide prior to the resumption of hydrogenation, for small amounts of carbon monoxide may have a deactivating effect upon newly regenerated cobalt metal catalyst.

Having thus described our invention, what we claim is:

1. A process for regenerating deactivated Oxo cobalt hydrogenation catalyst whereby said deactivated cobalt hydrogenation catalyst is substantially all converted to an active cobalt hydrogenation catalyst which comprises: contacting a deactivated cobalt hydrogenation catalyst with carbon monoxide under a pressure of carbon monoxide of from about 500 to about 2000 p.s.i. at a temperature in the range of from about 310° F. to about 600° F., while washing said deactivated cobalt hydrogenation catalyst with a cobalt-inert organic liquid.

2. A process for regenerating Oxo cobalt hydrogenation catalyst which comprises: contacting a deactivated cobalt hydrogenation catalyst with carbon monoxide under a partial pressure of carbon monoxide of from about 500 to about 2000 p.s.i. at a temperature of from about 375° F. to about 600° F., for a period of from about 5 to about 25 hours, while washing said deactivated cobolt hydrogenation catalyst with at least about 0.2 volume of cobalt-inert hydroxy-containing organic liquid compound per volume of said catalyst per hour.

3. The process of claim 2 wherein said cobalt-inert organic liquid comprises a heavy bottoms fraction obtained from the distillation of Oxo process product.

References Cited by the Examiner

UNITED STATES PATENTS

| | | | |
|---|---|---|---|
| 2,504,682 | 4/1950 | Harlan | 260—604 |
| 2,700,687 | 1/1955 | Catterall | 252—414 |
| 2,725,401 | 11/1955 | Mertzqeiller et al. | 260—604 |
| 2,815,387 | 12/1957 | Taylor | 260—604 |

FOREIGN PATENTS 550,617  12/1957  Canada.

MAURICE A. BRINDISI, *Primary Examiner.*